(12) United States Patent
Siegelman

(10) Patent No.: US 6,910,650 B1
(45) Date of Patent: Jun. 28, 2005

(54) DEVICE FOR THE DESTRUCTION OF FRANGIBLE ITEMS

(76) Inventor: Mark J. Siegelman, 7373 E. Doubletree Ranch Rd., Suite 200, Scottsdale, AZ (US) 85258

(*) Notice: Subject to any disclaimer, the term of this patent is extended or adjusted under 35 U.S.C. 154(b) by 190 days.

(21) Appl. No.: 10/263,932

(22) Filed: Oct. 2, 2002

(51) Int. Cl.[7] .............................................. A47J 17/00
(52) U.S. Cl. .................. 241/168; 241/198.1; 383/105; 53/121
(58) Field of Search ....................... 241/99, 168, 169.2, 241/198.1; 206/308.1, 312; 383/105, 119; 53/121, 122

(56) References Cited

U.S. PATENT DOCUMENTS

| | | | |
|---|---|---|---|
| 4,553,687 A | * | 11/1985 | Harkins et al. ................ 225/93 |
| 5,586,732 A | * | 12/1996 | Yamauchi et al. ........... 241/168 |
| 5,931,293 A | * | 8/1999 | Seelenmeyer ............. 206/308.1 |
| 6,189,446 B1 | * | 2/2001 | Olliges et al. .................. 101/6 |
| 6,290,058 B1 | * | 9/2001 | Lee et al. .................... 206/232 |
| 6,550,701 B1 | * | 4/2003 | Chang .......................... 241/36 |
| 6,676,050 B2 | * | 1/2004 | Chang ........................ 241/37.5 |

FOREIGN PATENT DOCUMENTS

EP          1273414     *  1/2003    ........... B29B 17/02

* cited by examiner

Primary Examiner—Ed Tolan
(74) Attorney, Agent, or Firm—Gregory J. Nelson

(57) ABSTRACT

A security device for breaking frangible items such as CDs. The device has a pouch of flexible material. The pouch has hinged jaws on one surface. The CD is placed in a pocket in the pouch and manual folding force is applied to cause the pouch and jaws to fold to break the contained CD.

6 Claims, 3 Drawing Sheets

DEVICE FOR THE DESTRUCTION OF FRANGIBLE ITEMS

FIELD OF THE INVENTION

This invention relates to a security device for the destruction of frangible information-bearing items and more specifically relates to a device for breaking CD's (Compact Discs) in order to render them unusable such that information stored on the CD's may no longer be accessed.

BACKGROUND OF THE INVENTION

The term "CD", as used herein, broadly refers to a Compact Disc, Mini Compact Disc, Disc and/or DVD (Digital Video Disc). There are currently two (2) conventional sizes of CD's that are manufactured and available to consumers, the 3" Mini CD and the 4¾" CD (surface diameter). Additionally, there are two (2) types of CD's available to consumers, Readable CD's and Readable-Writable CD's. The former allows the user to record information only once and provides unlimited access to the recorded information; the latter allows the user to record, erase and re-record as many times as desired and unlimited access to the recorded information.

CD's are comprised of a thin, circular polycarbonate substrate and, when used, are placed in a tray or receptacle of a Personal Computer and/or DVD/CD Player-Recorder. CD's are two sided having a digitally encoded information layer on one side only. The information-bearing surface is coated with a thin film of aluminum that is typically coated with a protective layer of acrylic. Information is recorded on CD's in "bits" on concentric circular tracks that are divided into sectors such that any set of bits (information) can be quickly accessed by the user.

CD's are widely used by individuals, businesses and government agencies which have at their disposal personal computers that contain CD-Writers and/or DVD-Rom hardware as well as by individuals who own DVD/CD Player-Recorder devices. CD's are widely used in conjunction with each aforementioned device for creating, storing and accessing (play back) audio, video, photo and data (e.g. documents, spreadsheets, etc.) files.

Individuals, businesses and government agencies are storing an increasing amount of sensitive and confidential information on CD's due to the wide use and dependence on personal computers as well as file storage requirements. The process of recording information on CD's creates efficiencies by reducing the physical space required to store paper documents and increasing the accessibility of those documents that are typically stored off premises.

At times, it is desirable to destroy paper documents that are no longer needed and or necessary to keep on file. Due to the sensitivity of such documents, paper documents are destroyed in a manner which renders them "unreadable." Various affordable devices and means are available to all consumers in the destruction of paper documents. Accordingly, it is a common practice for individuals, businesses (both large and small) and government agencies to utilize shredding machines, either shredders located on premises for small quantities, or a licensed shredding service for large quantities. Documents may also be destroyed by other methods such as incineration.

In the case of CD's, the same is not true. In order to render the information stored on a CD inaccessible, it is necessary to abrade the digitally encoded information-bearing surface in some manner. Currently, abrading devices available for the destruction of CD's are typically used by government agencies and large businesses in the destruction process on a grand scale; such devices are costly and impractical for the small to medium business and/or the individual. Therefore, in order to render a CD "unreadable", the latter users are relegated to destruction by such methods as striking the CD with a hammer or other tool or breaking the CD by hand. Both approaches present potential safety hazards as the CD typically will shatter creating large and small pieces akin to sharp glass shards. These shards can become imbedded in the user's hands and/or eyes. Therefore, there exists a need for a safe, effective and affordable device with which to destroy CD's that contain sensitive and/or no longer needed or wanted information.

BRIEF SUMMARY OF THE INVENTION

A primary objective of the present invention is to provide a device for effectively destroying frangible items, specifically individual CD's that contain sensitive and/or no longer needed information. The device of the present invention is easy to use and will render each individual CD useless for the retrieval of stored information. The device will provide a safe, effective, reliable and inexpensive alternative to hazardous destruction methods which may be used by both individuals and small businesses.

The device has a pouch-like soft, durable, flexible body having a pocket that is sized to receive CDs of several sizes. The body has an integral flap which may be secured in a closed position by a loop and hook type fastener such as Velcro® or by a conventional snap fastener.

Typically, the flap overlaps the front surface of the pouch with the CD inside in order to create a closed and sealed position. The flap may be opened to insert a CD for destruction; the flap may be opened to access the destroyed CD pieces and safely discard them. The material of the device is preferably a soft, yet durable fabric such as nylon, cotton or blends; the material is padded for the comfort and safety of the user.

One surface of the body, opposite the side on which the flap overlaps, carries rigid jaws that may be manually closed to apply a force to crush the contents. The rigid jaws may comprise a pair of metal or high density plastic plates joined together at a hinge. The jaws may be attached to the body or inserted into a sleeve sewn on the body.

The CD to be destroyed is placed inside the open pocket, with the shiny side of the CD facing the front side of the pouch (the side of the pouch which the flap overlaps).

After the CD is properly positioned inside the pocket in the pouch, the flap is closed and secured. The user then holds the device with the flap facing downwards, the user gripping the top of the body. The device is positioned relative to a hard surface at approximately a 10° angle with the rigid jaws disposed toward the hard surface. While gripping the device with both hands, a manual force is applied with the user in either a sitting or standing position using the heels of both hands thus causing the CD within the device to bend along a transverse axis until it breaks. Once the CD has been broken (destroyed), the flap may be opened and the pieces and shards may be safely emptied into a trash container.

BRIEF DESCRIPTION OF THE DRAWINGS

The above and other objectives and advantages of the present invention will be more fully understood and appreciated from the following specifications, claims and drawings in which:

DETAILED DESCRIPTION OF THE DRAWINGS

Figure 1:
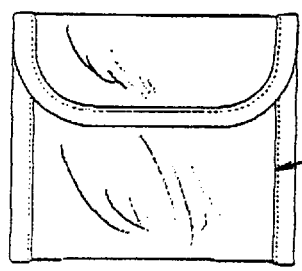
FIG. 1 is a front plan view of the device for destroying CD's according to the present invention.

Turning now to the drawings of the device, particularly FIGS. 1 to 5, the present invention is generally designated by the numeral 10 and is intended for use in breaking a CD into various sized pieces such that the information contained on the CD is no longer accessible (readable). The device may be used by businesses, government agencies and individuals who store information on CD's. The device 10 is designed to destroy a single CD at a time in a safe, effective manner by physically breaking the CD when placed in a flexible and durable pouch.

The device is shown as being generally square in shape having opposite sides 12 and 14, a top edge 16 and bottom edge 18. The dimensions of the device are slightly larger than the diameter of a 4¾" CD and will also accommodate a 3" Mini CD as well as larger diameter discs.

Figure 5:
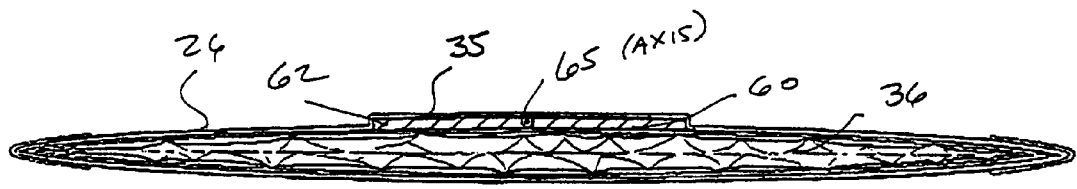
FIG. 5 is a cross sectional view taken along line 5—5 of FIG. 3.

The pouch has a closure shown in the form of a flap 22 that in the closed position, overlaps the front surface 24. The pouch and flap can be integrally cut from a single piece of durable, flexible, padded material that may be natural (cotton), synthetic polyester, nylon, vinyl or a blend of the former and the latter. The material may be multi-layered, as shown in FIG. 5, by incorporating an appropriate padding 36 (poly/cotton fiber blend or foam) that is interposed onto the interior surfaces thereby forming a lining. The lining creates both comfort and safety for the user.

During construction, a single piece of material is cut from a pattern shaped and elongate section that is folded along the bottom edge 18 and finished by an appropriate sewing operation. The opposite edges 12, 14 may be finished by stitching 30 and seam tape 32, as shown, may be applied to enhance the appearance of the device. If a synthetic material, such as vinyl, is used in the manufacture of the device 10, the edges may be sealed by conventional heat-sealing or adhesive methods.

Figure 4:
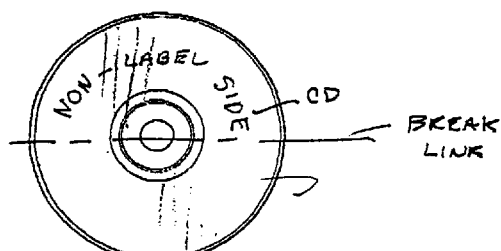
FIG. 4 is a plan view showing the device in an open position with a CD aligned with the pocket.
Figure 4:
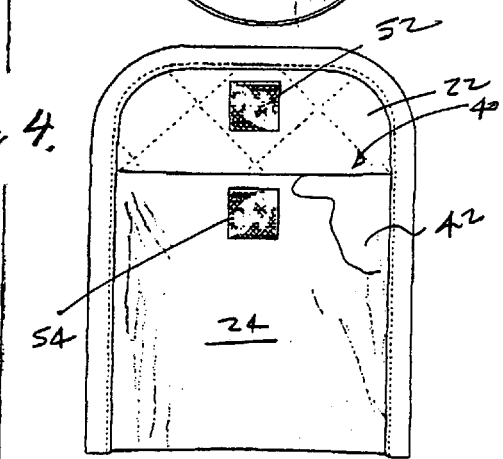

The body defines an opening 40 that provides access to the interior pocket 42 of the device for the placement of the CD. The pocket is sized to receive a 4¾" CD (or a 3" Mini CD), as shown in FIG. 4, such that the CD may be fully inserted into the pocket. The flap 22 may be folded over the opening 40 along edge 16 and secured to the front side 24 by a fastener. The fastener may be comprised of components such as snap fasteners or the loop and hook fastener components 52 and 54 as best seen in FIG. 4 or by other conventional fasteners.

The rear surface 26 of the pouch is provided with rigid jaws 60, 62. The rear surface is the side opposite to the surface where the flap resides in a closed position. The rigid jaws provide and transfer the force to the CD inside the device, which causes the CD to break into pieces.

The rigid jaws 60, 62 are shown as a pair of plates, preferable high density plastic or metal, which fold along a transverse hinge axis 65. The hinge axis generally extends transverse the rear surface, parallel and equidistant to the top and bottom edges 16 and 18. The rigid jaws may be smaller than the surface 26 to which they are attached. It has been found that each jaw may be approximately 1" in height and about 2" in transverse length. The rigid jaws may be two metal or plastic plates secured at a hinge element 65. The rigid jaws may also be separate metal or plastic plates placed in an abutting relationship such that they fold along the hinge axis.

Figure 2:
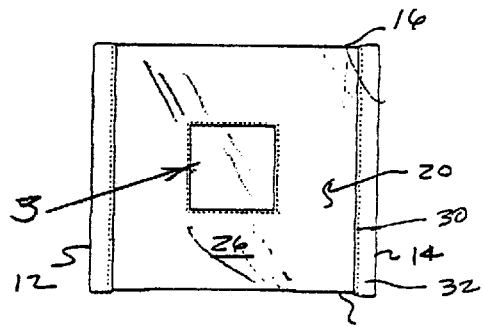
FIG. 2 is a rear plan view thereof.
Figure 3:
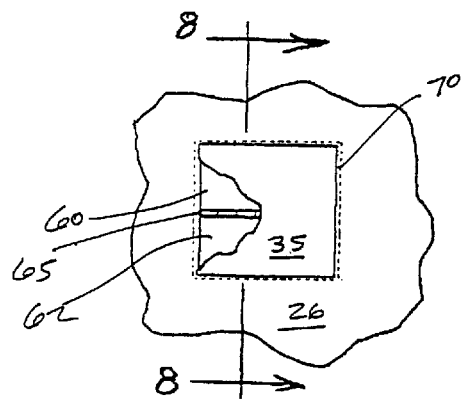
FIG. 3 is a detail view of the rigid jaw as indicated in FIG. 2.

The rigid jaws 60, 62 may be adhesively secured to the rear surface 26 of the device. However, it is preferable that they be inserted in a sleeve or opening 35 formed between the outer layer and the lining of the rear surface and held in place by a peripheral stitch line 70 as shown in FIGS. 2, 3 and 5.

USE

Figure 7:
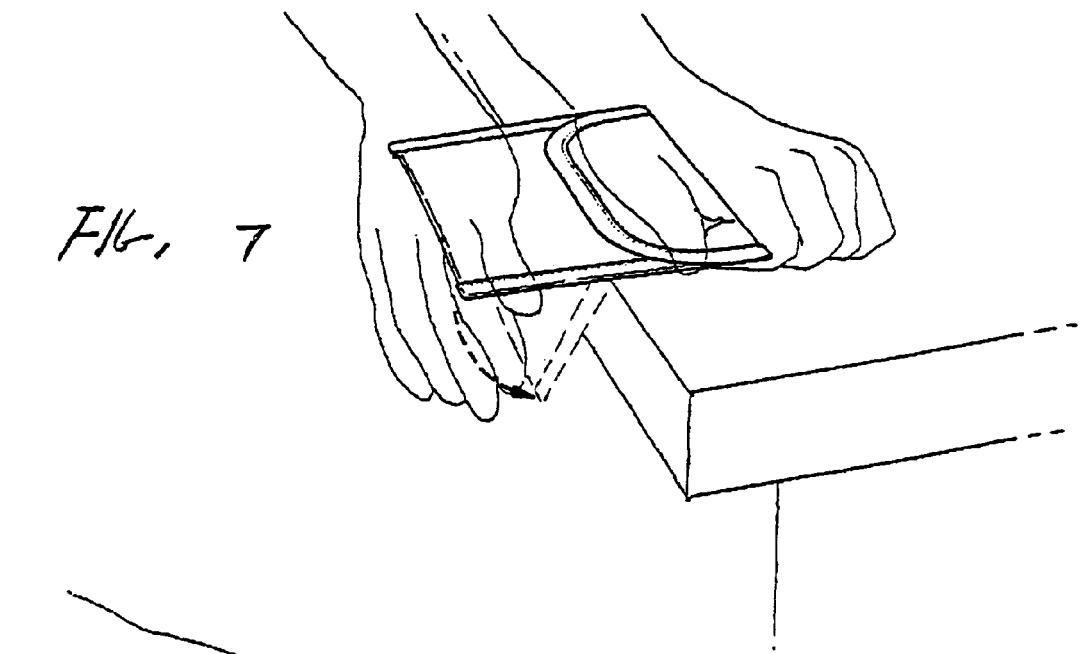
FIG. 7 is an illustration showing another manner in which the device may be used to destroy a CD.

The present invention will be better understood and appreciated from the following description of use as shown in FIG. 7. The device is used to safely and conveniently destroy the information layer of a CD by breaking the CD into various sized pieces. This is accomplished by opening the flap 22 to the position shown in FIG. 4 and fully inserting a CD within the internal pocket 40. Once the CD is inside the pocket, the flap 22 is closed and secured by fasteners 52, 54. The device is now in a useable condition as shown in FIG. 1. It is preferable that the CD is placed inside the pocket with the shiny side of the CD facing the front side 24 as shown in FIG. 4. If a CD contains a label, the non-label bearing side will be positioned with the non-label bearing side disposed against the inner surface of side 24 of the device as shown in FIG. 4.

Figure 6:
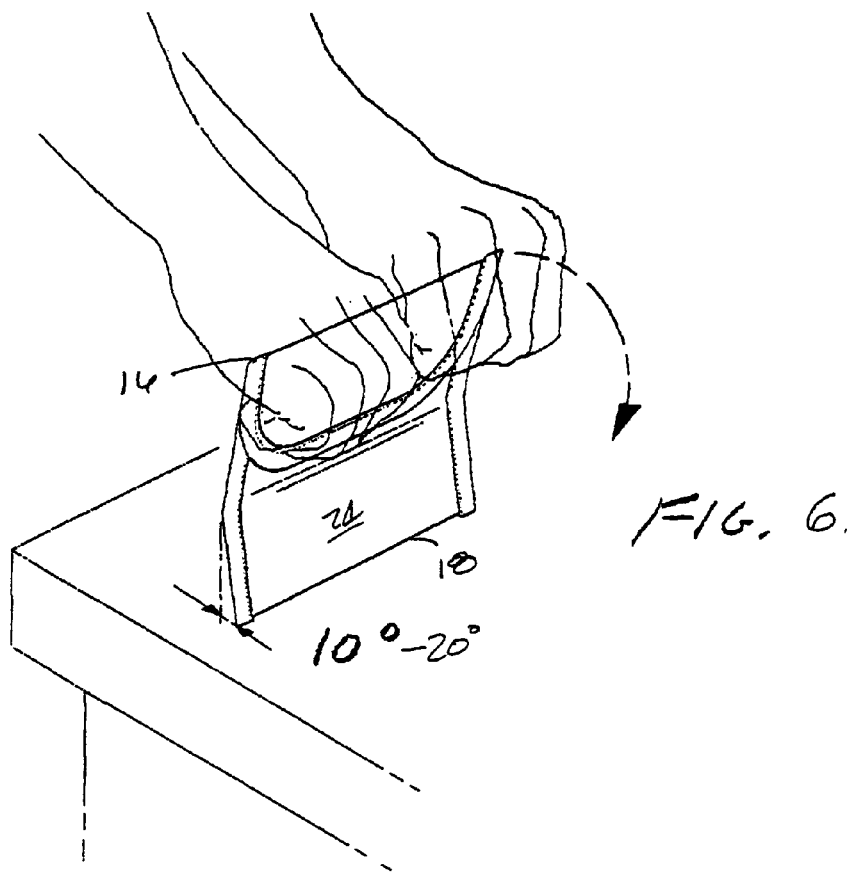
FIG. 6 illustrates the use of the device of the present invention.
Figure 8:
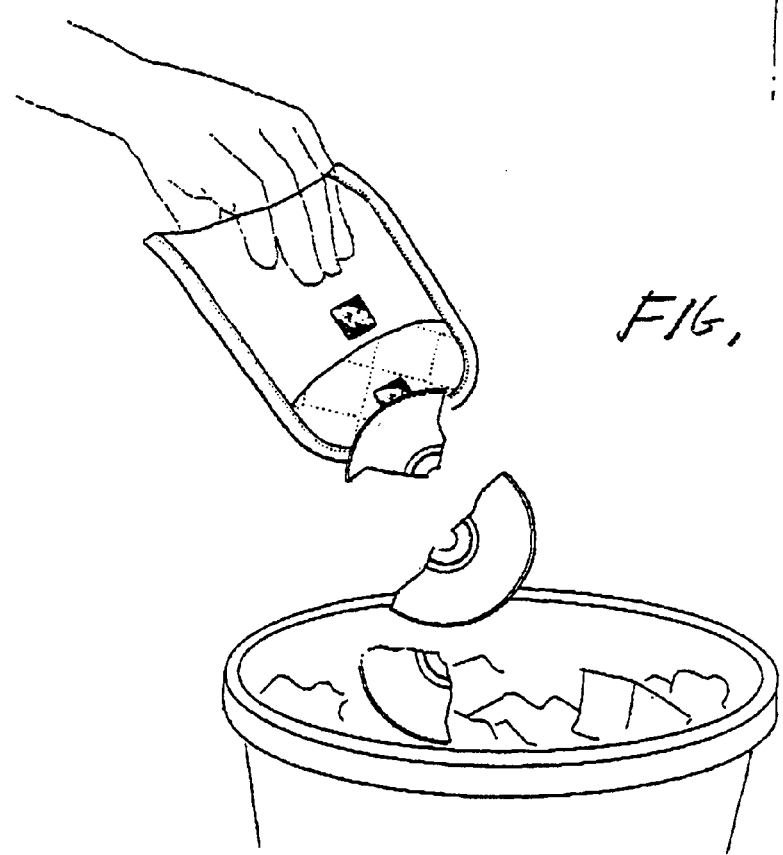
FIG. 8 illustrates the disposal of the CD after it has been destroyed.

The user will then grip the device along the top edge 16 using both hands as shown in FIG. 6. The device is placed at an angle with respect to a hard surface, such as a table or desk. Preferably, the device is disposed at an angle of approximately 10° to 20°. The bottom edge 18 of the device engages the table or desk and the front side 24 of the device is disposed facing outwardly as shown in FIG. 6. Using the heels of both hands, the user may now apply a manual force as required to cause the device to fold along the jaw axis. The manual force applied to the device causes the rigid jaws 60, 62 to close or hinge, thereby exerting a secondary force on the CD inside the device. As the rigid jaws continue to close, the CD will begin to bend along the break line until it fractures into a number of pieces or fragments as seen in FIGS. 4, 6 and 7. The pieces are safely contained inside the closed, padded pocket. The CD will emit a sharp snapping sound when it is broken allowing the pouch to fold completely in half. Once the CD has been broken, the user may position the device in an inverted position over a trash container, open the flap of the device and safely dispose of the contents as shown in FIG. 8. The device can destroy one CD at a time; the device should be emptied after each use.

The destruction procedure can also be accomplished in other ways, for example as shown in FIG. 7, the device 10 is placed with the hinge axis of the jaws aligned with the edge of a hard flat surface such as a table or desk. The protruding portion of the device may then be sharply forced downwards using one hand to hold the device in place and using the other hand to apply pressure on the protruding portion on the device. It is preferable to apply this procedure from a standing position.

The device safely contains all the broken CD pieces after each use preventing injury to the user. Also, the padded lining and durable surfaces will protect the user from injury that might otherwise be caused by the creation of sharp pieces as the CD is breaking. However, as is the case with any sharp, broken materials, the user must employ caution in the disposal of broken CD's in order to prevent injury to others. Therefore, it is important to make certain that trash or trash receptacles into which the CD pieces are discarded are safely located out of the reach of children and others who might be at risk.

From the foregoing, it will be seen that the present invention provides a safe, effective and affordable means of destroying individual CD's containing stored information that is no longer needed by the user. The destruction process provided by the invention renders such information inaccessible/unreadable. The invention's design precludes injury to users. The invention's affordability makes it available to a majority of CD users.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A device for the destruction of a frangible item such as a compact disc comprising:
   (a) a flexible pouch having front and rear surfaces defining a pocket sized to receive a disc to be destroyed; and
   (b) rigid jaw means positioned on one of said surfaces whereby said pouch may be folded by application of a manual force causing said jaw means to transfer said force to the contained disc thereby breaking same, said rigid jaw means including first and second plates foldable relative to one another.

2. The device of claim 1 wherein said pouch has an opening and a flap extendable over said opening.

3. The device of claim 2 wherein said flap has a closure member engageable with a surface.

4. The device of claim 3 wherein the closure comprises sections of loop and hook fabric fastening material.

5. The device of claim 1 wherein said pouch is a fabric having padding associated therewith.

6. A device for the destruction of a breakable disc such as a compact disc comprising:
   (a) a pouch of flexible fabric material having a front surface and a rear surface, said surfaces being joined to define an internal pocket sized to receive a disc, said pocket having an opening, said rear surface having an extension forming a flap extendable over said opening;
   (b) closure means associated with said flap and said front surface for retaining said flap in a closed position; and
   (c) rigid jaws positioned on said rear surface, said rigid jaw including a first and second plate hinged along a hinge line extending generally transversely of said rear surface whereby said pouch may be folded by applying a manual force thereto causing said jaws to pivot relative to one another to transfer said force to a contained disc thereby breaking same.

* * * * *